Patented Apr. 21, 1953

2,636,015

UNITED STATES PATENT OFFICE 2,636,015

PRINTING INKS

Alfred F. Schmutzler, Teaneck, N. J., assignor to American Cyanamid Company, New York, N. Y., a corporation of Maine No Drawing. Application October 6, 1950, Serial No. 188,869

15 Claims. (Cl. 260—33.2)

This invention relates to a novel class of printing ink vehicles and, more particularly, to a novel class of steam-setting printing ink vehicles. Still further, this invention relates to steam-setting printing inks containing a vehicle comprising a copolymer of (1) an olefinic hydrocarbon and (2) a hydroxy alkyl ester of an alpha, beta unsaturated carboxylic acid dispersed in a solvent comprising a polyhydric alcohol containing from 2–6 carbon atoms and from 2–4 hydroxy groups.

One of the objects of the present invention is to produce a printing ink vehicle. A further object of the present invention is to produce a steam setting printing ink, which has excellent stability on the printing press, even at high humidities. A still further object of the present invention is to produce a steam setting printing ink which is capable of producing prints, when exposed to steam, which harden very quickly to non-offsetting films. A further object of the present invention is to produce a steam setting printing ink comprising a novel vehicle containing a copolymer of (1) an olefinic hydrocarbon and (2) a hydroxy alkyl ester of an alpha, beta unsaturated carboxylic acid dispersed in a solvent comprising a polyhydric alcohol containing from 2–6 carbon atoms and from 2–4 hydroxy groups. These and other objects of the present invention will be discussed more fully hereinbelow.

The applicant has discovered that by polymerizing an olefinic hydrocarbon with a hydroxy alkyl ester of an $\alpha,\beta$ unsaturated carboxylic acid, and by dispersing the resultant copolymer in a suitable solvent as defined hereinabove, he is able to produce a printing ink vehicle which has unusually desirable properties when used in a printing ink for steam setting printing processes. The present steam setting printing inks have very good stability on the press and set slowly on exposure to steam or they have poor stability on the press and dry quickly on exposure to steam. The printing inks of the present invention incorporate both of the desirable properties of steam setting printing inks, namely excellent stability on the press even at high humidities and fast set and quick drying properties when exposed to steam to produce very quickly hard non-offsetting films.

In order to illustrate the concept of the present invention, the following examples are set forth in which all parts are parts by weight. It should be remembered that these examples are set forth solely for the purpose of illustration and specific enumeration of detail should not be interpreted as limitations on the case except as indicated in the appended claims. All Gardner-Holdt viscosity readings taken at 25° C.

EXAMPLE 1

66 parts of bis(2,3-dihydroxy propyl) maleate, 19 parts of glycerin, 45 parts of styrene, 45 parts of alpha, methyl styrene, 450 parts of diethylene glycol, 3 parts of bis(tertiary butylperoxy) butane are introduced into a suitable reaction chamber equipped with stirrer, thermometer, and reflux condenser. The charge is stirred thoroughly and heated gradually to 153° C. in a 2 hour period. The temperature is then maintained at 153°–155° C. for a 5 hour period, cooled to 150° C. and 0.03 part of hydroquinone is added. The viscosity of a 25% solids solution of the copolymer is approximately Q on the Gardner-Holdt scale.

EXAMPLE 2

102 parts of bis(2-hydroxy ethyl) maleate, 21 parts of ethylene glycol, 26 parts of styrene, 26 parts of alpha, methyl styrene, 232 parts of diethylene glycol and 2 parts of bis(tertiary butylperoxy) butane are introduced into a suitable reaction chamber as in Example 1 and the charge is thoroughly mixed and then heated with constant stirring to 150° C. in a 2 hour period. The charge is maintained at a temperature of 150–155° C. for an additional 8 hours and cooled. The viscosity of a 33% solids dispersion of the copolymer is approximately Q on the Gardner-Holdt scale.

The copolymers produced in accordance with Examples 1 and 2 may be used in the formulation of steam setting printing inks in the following manner.

Printing ink A 60 parts of chrome yellow pigment and 40 parts of the vehicle prepared according to Example 2 are mixed thoroughly in the conventional manner to produce a steam setting printing ink which is capable of setting to a hard non-offsetting film very quickly upon exposure to steam.

Printing ink B 60 parts of chrome yellow pigment and 40 parts of the vehicle produced according to Example 1 are thoroughly blended and mixed in the conventional manner to produce a steam setting printing ink, which will, after having been printed, set quickly (within several seconds) to a hard and non-offsetting film on exposure to steam.

The prints of ink A and ink B will also dry at room temperature in about ½ hour even though they are not exposed to steam. The setting of the printing inks A and B can also be accomplished in a comparatively short time by running water over the prints. The chrome yellow pigment used in both inks A and B is known to be reactive with high acid number resins and bodied drying oils which frequently cause such pigment pastes to liver. The vehicles of Examples 1 and 2 are free of this tendency as the acid number of these vehicles is very low. These vehicles (1 and 2) usually have an acid number of less than 1.0 although such an exceedingly low acid number is not a requirement in the preparation of the printing ink vehicles of the present invention. The acid number of the printing ink vehicle may be 20 or even higher without experiencing livering of the pigmented compositions.

In addition to the chrome yellow used above, one may use dyes, such as rhodamine, methyl violet, Victoria blue, chrysoidine (base), malachite green, or the like, and pigments such as carbon black, lithol toners, such as lithol red, toluidine toners, phthalocyanine blue, phthalocyanine green, phosphotungstic acid toners, aluminum hydrate lakes, hanza yellow, fire red toner, molybdate orange, chrome orange, benzidine yellow, titanium oxide white, and the like. Some of the above listed pigments are what are known as high oil adsorptive pigments and are recognized as such. When these particular pigments, such as carbon black, phthalocyanine blue and the like are used, it is generally desirable to add more of the glycol to the ink paste. When low oil adsorptive pigments such as chrome yellow and chrome orange are used, it is not necessary to add any additional glycol. The ratios of pigment to vehicle in the formulation of the inks of the present invention may be varied over the conventional range, and it is well known in the art that in the selection of certain pigments, such as carbon black, the amount of pigment used will differ in a slight measure from the amount of pigment such as phthalocyanine blue which may be used.

EXAMPLE 3

102 parts of bis(2-hydroxy ethyl) maleate, 21 parts of ethylene glycol, 58 parts alpha, methyl styrene, 2 parts of bis(tertiary butylperoxy) butane and 428 parts of diethylene glycol are introduced into a suitable reaction chamber equipped as in Example 1 and the charge is thoroughly stirred and then heated gradually with constant stirring to 150° C. in a 2 hour period and then is maintained at a temperature of 150–155° C. for a 16 hour period. The resultant copolymer is cooled and has a viscosity of approximately E on the Gardner-Holdt scale.

EXAMPLE 4

147 parts of maleic acid anhydride, 413 parts of ethylene glycol and 45 parts of xylol are incorporated into a suitable reaction chamber equipped with thermometer, stirrer and means for the azeotropic distillation of water. The charge is heated for approximately 3 hours at 180–210° C., while distilling off water azeotropically until the acid number of the ester thus formed is less than 1.0. Then the xylol is boiled off by heating to a temperature of 250° C., while passing gaseous nitrogen through the charge. The batch is cooled to 150° C. and a mixture of 265 parts of styrene, 60 parts of alpha, methyl styrene, 9 parts of cumene hydroperoxide, 0.5 part acetaldehyde, and 0.6 part of mercaptoethanol is added gradually over a 1 hour period, while maintaining the temperature at about 140°– 150° C. The charge is gradually heated to 243° C. in a 2 hour period. During the last step, the batch may be blown with gaseous nitrogen to remove any of the unreacted styrenes. The viscosity of the resultant copolymer in solution was approximately Z–2 on the Gardner-Holdt scale. The reaction could have been stopped at any intermediate temperature but, in this instance, it was preferred to make a very viscous copolymer solution.

In the place of the mixture of styrene and alpha, methyl styrene, styrene alone can be used in the copolymerization with the hydroxy alkyl ester or other monomeric organic substances which contain the polymerizably reactive group $CH_2=C<$ may be used such as acrylonitrile, cyclopentadiene, isoprene, vinyl pyridine, vinyl naphthalene, ring substituted styrenes such as o-, m-, or p-methyl styrene, 2,4-dimethyl styrene, 2,5-dimethyl styrene, 2,3-dimethyl styrene, divinyl benzene, vinyl cyclohexane and the like, or various esters with polymerizable groups can be used such as allyl esters, allyl phthalate, allyl sebacate, allyl phosphate, and the like, vinyl esters, such as vinyl chloride, vinyl acetate, or the like. With the monomers containing but one vinyl group, it is most convenient to stop polymerization at a suitable viscosity. A greater precaution is required with those monomers containing more than one polymerizable grouping. Since they have the tendency to cross polymerize, gel-like systems form readily, but they can be prevented by limiting the solids content of the dispersions or stopping the polymerization before or at the first sign of incipient gelling with compounds such as hydroquinone, butyl catechol, toluquinone, 2,5 - ditertiarybutyl hydroquinone, phenol, substituted phenols, etc. Such compounds are usually sufficient if added in amounts ranging from .001 to 0.1%, the efficiency being greater with larger additions, which need not be limited to the higher limit.

In the place of the bis(3-hydroxy propyl) maleate or the bis(2 hydroxy ethyl) maleate, other hydroxy alkyl esters can be used such as the corresponding fumarates, itaconates, aconitates, crotonates, acrylates, and the like such as 2-hydroxy ethyl acrylate, 3-hydroxy propyl acrylate, 4-hydroxy butyl acrylate, 5-hydroxy amyl acrylate, 6-hydroxy hexyl acrylate, 7-hydroxy heptyl acrylate, 8-hydroxy octyl acrylate, 9-hydroxy nonyl acrylate, 10-hydroxy decyl acrylate, 2-hydroxy ethyl methacrylate, 4-hydroxy butyl methacrylate, 6-hydroxy hexyl methacrylate, 9-hydroxy nonyl methacrylate, 3-hydroxy propyl crotonate, 4-hydroxy butyl crotonate, 4-hydroxy butyl crotonate, 7-hydroxy heptyl crotonate, 10-hydroxy decyl crotonate; di-2-hydroxy ethyl maleate, di(4-hydroxy butyl) maleate, di(6-hydroxy hexyl) maleate, di(8-hydroxy octyl) maleate, di(10-hydroxy decyl) maleate, di(2-hydroxy ethyl) fumarate, di(4-hydroxy butyl) fumarate, di(7-hydroxy heptyl) fumarate, di(9-hydroxy nonyl) fumarate, di(10-hydroxy decyl) fumarate, and the like. Additionally, one may use substituted hydroxy alkyl esters of the alpha, beta unsaturated carboxylic acids wherein the substituent is present on the alkyl chain such as 3-chloro 4-hydroxy butyl acrylate, 4-dichloro 6-hydroxy hexyl acrylate, 3-nitro 8-hydroxy octyl acrylate, di(3-bromo-4-hydroxy butyl) maleate, di(4,8-dihydroxy 6-chloro octyl) fumarate and the like. The ratio of the components forming the copolymers, namely the olefinic hydrocarbons to the hydroxy alkyl esters should be within the range of 0.3:1 to 3.0:1, respectively, by weight based on the total weight of the copolymer. When the lower polyhydric alcohols, such as ethylene glycol and propylene glycol, are used as the solvent or dispersing medium, the weight ratios between the olefinic hydrocarbons and the hydroxy ester should be about 0.3:1, respectively, by weight. When the higher molecular weight polyhydric alcohols are used such as dipropylene glycol, the ratio of the olefinic hydrocarbons to the hydroxy esters should be within the range of 1.5:1 to 3:1, respectively, by weight based on the total weight of the copolymer. With the high molecular weight polyhydric alcohols which may be used as solvents for the copolymers such as butylene glycol, pentanediols, hexanediols, and the like, the ratio of the olefinic hydrocarbon to the hydroxy ester should be about 3.0:1, respectively, by weight based on the total weight of the copolymer.

Although the printing inks of the present invention are designed primarily for use in the steam setting printing process, they may be modified so as to be adapted for use in heat setting printing processes and air drying printing processes by selecting a polyhydric alcohol having desired characteristics for the particular application. For instance, for heat setting printing inks, the polyhydric alcohol used as a solvent in the vehicle should preferably have a boiling point between 170–225° C., whereas for air drying, any one of the polyhydric alcohols may be used with the choice depending on the desired drying rate of the ink. If it is desired to have a hot melt ink, the solid polyhydric alcohols such as pentaerythritol and dipentaerythritol may be used.

In addition to those polyhydric alcohols set forth in the discussions hereinabove, one may also use to advantage such polyhydric alcohols as propylene glycol, butanediol-1,3, butanediol-1,2, butanediol-1,4, pentanediol-1,2, pentanediol-1,4, pentanediol-1,5, hexanediol-1,2, hexanediol-1,4, hexanediol-1,6, dipropylene glycol, diethylene glycol, triethylene glycol, tripropylene glycol, pentaerythritol, trimethylol ethane, trimethylol propane and the like. For the most part, it is desirable to use that polyhydric alcohol as a solvent which has also been used in the preparation of the hydroxy alkyl esters of the alpha, beta unsaturated carboxylic acid, although this is not necessary and in fact sometimes impractical such as when the reagent alcohol is a solid.

In place of the bis(tertiary butyl peroxy) butane, other catalysts may be used in the preparation of the copolymers such as the organic oxides and peroxides which are glycol soluble. More specifically, catalysts such as benzoyl peroxide, acetyl peroxide, di(tertiary butyl) peroxide, cumene hydroperoxide, ketone peroxides, cyclohexanol peroxide, hydroxy cyclohexyl peroxide, tertiary butyl diperphthalate, tertiary butyl perbenzoate, tetralin hydroperoxide, and the like.

The amount of catalyst may vary between 0.1 to 5% depending upon the chain length of the polymers desired; with the higher amounts, the polymerization proceeds faster but the chain length is shorter. It is sometimes advantageous, especially at the lower catalyst concentrations, to introduce a polymerization promoter, such as a mercaptan, as mercaptoethanol or preferably one which contains from 8 to 14 carbon atoms per molecule. The function of the mercaptan is to increase the rate of polymerization or effecting a better conversion in a shorter period of time.

I claim:

1. A printing ink vehicle useful in steam setting printing inks comprising a copolymer of (1) a monomeric organic substance which contains the polymerizably reactive group $CH_2=C<$ and (2) a hydroxy alkyl ester of an $\alpha,\beta$ unsaturated carboxylic acid, dispersed in a polyhydric alcohol containing from 2–6 carbon atoms and 2–4 hydroxy groups, wherein the ratio of (1) to (2) is 0.3:1 to 3.0:1 by weight, respectively.

2. A printing ink vehicle useful in steam setting printing inks comprising a copolymer of (1) styrene and (2) a hydroxy alkyl ester of an $\alpha,\beta$ unsaturated carboxylic acid, dispersed in a polyhydric alcohol containing from 2–6 carbon atoms and 2–4 hydroxy groups, wherein the ratio of (1) to (2) is 0.3:1 to 3.0:1 by weight, respectively.

3. A printing ink vehicle useful in steam setting printing inks comprising a copolymer of (1) alpha, methyl styrene and (2) a hydroxy alkyl ester of an $\alpha,\beta$ unsaturated carboxylic acid, dispersed in a polyhydric alcohol containing from 2–6 carbon atoms and 2–4 hydroxy groups, wherein the ratio of (1) to (2) is 0.3:1 to 3.0:1 by weight, respectively.

4. A printing ink vehicle useful in steam setting printing inks comprising a copolymer of (1) an alkyl ring substituted styrene and (2) a hydroxy alkyl ester of an alpha, beta unsaturated carboxylic acid, dispersed in a polyhydric alcohol containing from 2–6 carbon atoms and 2–4 hydroxy groups, wherein the ratio of (1) to (2) is 0.3:1 to 3.0:1 by weight, respectively.

5. A printing ink vehicle useful in steam setting printing inks comprising a copolymer of (1) a monomeric organic substance which contains the polymerizable reactive group $CH_2=C<$ and (2) di-(2-hydroxy ethyl) maleate dispersed in a polyhydric containing from 2–6 carbon atoms and 2–4 hydroxy groups, wherein the ratio of (1) to (2) is 0.3:1 to 3.0:1 by weight, respectively.

6. A printing ink vehicle useful in steam setting printing inks comprising a copolymer of (1) a monomeric organic substance which contains the polymerizably reactive group $CH_2=C<$ and (2) di-(3-hydroxy propyl) maleate, dispersed in a polyhydric alcohol containing from 2–6 carbon atoms and 2–4 hydroxy groups, wherein the ratio of (1) to (2) is 0.3:1 to 3.0:1 by weight, respectively.

7. A printing ink vehicle useful in steam setting printing inks comprising a copolymer of (1) a monomeric organic substance which contains the polymerizably reactive group $CH_2=C<$ and (2) di-(2,3-dihydroxy propyl) maleate, dispersed in a polyhydric alcohol containing from 2–6 carbon atoms and 2–4 hydroxy groups, wherein the ratio of (1) to (2) is 0.3:1 to 3.0:1 by weight, respectively.

8. A printing ink vehicle useful in steam setting printing inks comprising a copolymer of (1) a monomeric organic substance which contains the polymerizably reactive group $CH_2=C<$ and (2) a hydroxy alkyl ester of an $\alpha,\beta$ unsaturated carboxylic acid, dispersed in diethylene glycol wherein the ratio of (1) to (2) is 0.3:1 to 3.0:1 by weight, respectively.

9. A printing ink vehicle useful in steam setting printing inks comprising a copolymer of (1) a monomeric organic substance which contains the polymerizably reactive group $CH_2=C<$ and (2) a hydroxyl alkyl ester of an $\alpha,\beta$ unsaturated carboxylic acid, dispersed in dipropylene glycol, wherein the ratio of (1) to (2) is 0.3:1 to 3.0:1 by weight respectively.

10. A printing ink vehicle useful in steam setting printing inks comprising a copolymer of (1) a monomeric organic substance which contains the polymerizably reactive group $CH_2=C<$ and (2) a hydroxyl alkyl ester of an alpha,beta unsaturated carboxylic acid, dispersed in hexanediol 1,3, wherein the ratio of (1) to (2) is 0.3:1 to 3.0:1 by weight, respectively.

11. A printing ink vehicle useful in steam setting printing inks comprising a copolymer of (1) styrene and (2) di-(2-hydroxy ethyl) maleate dispersed in a polyhydric alcohol containing from 2–6 carbon atoms and 2–4 hydroxy groups, wherein the ratio of (1) to (2) is 0.3:1 to 3.0:1 by weight, respectively.

12. A printing ink vehicle useful in steam setting printing inks comprising a copolymer of (1) styrene and (2) di-(3-hydroxy propyl) maleate, dispersed in a polyhydric alcohol containing from 2–6 carbon atoms and 2–4 hydroxy groups, wherein the ratio of (1) to (2) is 0.3:1 to 3.0:1 by weight, respectively.

13. A printing ink vehicle useful in steam setting printing inks comprising a copolymer of (1) styrene and (2) di-(2,3 dihydroxy propyl) maleate, dispersed in a polyhydric alcohol containing from 2–6 carbon atoms and 2–4 hydroxy groups, wherein the ratio of (1) to (2) is 0.3:1 to 3.0:1 by weight, respectively.

14. A printing ink vehicle useful in steam setting printing inks comprising a copolymer of (1) an alkyl ring substituted styrene and (2) di-(2-hydroxy ethyl) maleate, dispersed in a polyhydric alcohol containing from 2–6 carbon atoms and 2–4 hydroxy groups, wherein the ratio of (1) to (2) is 0.3:1 to 3.0:1 by weight, respectively.

15. A printing ink vehicle useful in steam-setting printing inks comprising a copolymer of (1) styrene and (2) di-(2-hydroxy ethyl) maleate dispersed in diethylene glycol, wherein the ratio of (1) to (2) is 0.3:1 to 3.0:1 by weight respectively.

ALFRED F. SCHMUTZLER.

References Cited in the file of this patent

UNITED STATES PATENTS

| Number | Name | Date |
|---|---|---|
| 2,437,908 | Chiappe | Mar. 16, 1948 |